(12) United States Patent
Kriebel et al.

(10) Patent No.: US 11,240,962 B2
(45) Date of Patent: Feb. 8, 2022

(54) SYSTEM AND METHOD FOR CONTROLLING AN AGRICULTURAL HARVESTING CAMPAIGN

(71) Applicant: CLAAS Selbstfahrende Erntemaschinen GmbH, Harsewinkel (DE)

(72) Inventors: Bastian Kriebel, Feriburg (DE);
Jannik Redenius, Pr. Oldendorf (DE);
Bastian Bormann, Gütersloh (DE);
Joachim Baumgarten, Beelen (DE);
Andreas Skiba, Bielefeld (DE)

(73) Assignee: CLAAS Selbstfahrende Erntemaschinen GmbH, Harswinkel (DE)

( * ) Notice: Subject to any disclaimer, the term of this patent is extended or adjusted under 35 U.S.C. 154(b) by 286 days.

(21) Appl. No.: 16/430,640

(22) Filed: Jun. 4, 2019

(65) Prior Publication Data

US 2019/0364734 A1    Dec. 5, 2019

(30) Foreign Application Priority Data

Jun. 5, 2018   (DE) .......................... 102018113327.8

(51) Int. Cl.
*A01D 41/127*       (2006.01)
*A01B 69/00*        (2006.01)
(Continued)

(52) U.S. Cl.
CPC ........ *A01D 41/1278* (2013.01); *A01B 69/004* (2013.01); *A01B 79/005* (2013.01);
(Continued)

(58) Field of Classification Search
CPC ................ A01D 34/008; A01D 41/127; A01D 41/1278; A01B 69/004; A01B 69/008;
(Continued)

(56) References Cited

U.S. PATENT DOCUMENTS 9,710,771 B2*   7/2017   Chiocco ................. A01D 93/00
2006/0213167 A1*  9/2006  Koselka ............... A01B 79/005
56/10.2 A (Continued)

FOREIGN PATENT DOCUMENTS

BE       1024475 B1      3/2018
DE    102016118651 A1    4/2018
(Continued)

OTHER PUBLICATIONS

EP-2174537-A1 PE2E Machine Translation. (Year: 2021).*

*Primary Examiner* — Kevin P Mahne
(74) *Attorney, Agent, or Firm* — Lempia Summerfield Katz LLC

(57) ABSTRACT

A method and apparatus for controlling an agricultural harvesting campaign is disclosed in which predetermined harvesting activities are processed within a campaign timeline by a plurality of agricultural working machines of a machine fleet on a field allotment assigned to the harvesting campaign. The control of the harvesting campaign is executed on different application levels by continuously generating information, wherein the generated information is continuously provided to all of the application levels, and the generated data comprise remotely-sensed field information.

19 Claims, 5 Drawing Sheets

(51) Int. Cl.
  *A01B 79/02* (2006.01)
  *G05D 1/02* (2020.01)
  *G06Q 50/02* (2012.01)
  *A01B 79/00* (2006.01)

(52) U.S. Cl.
  CPC .......... *A01B 79/02* (2013.01); *G05D 1/0217* (2013.01); *G05D 1/0219* (2013.01); *G05D 1/0287* (2013.01); *G05D 2201/0201* (2013.01)

(58) Field of Classification Search
  CPC .... A01B 79/005; A01B 79/02; G05D 1/0027; G05D 1/021; G05D 1/0214; G05D 1/0217; G05D 1/0219; G05D 1/0276; G05D 1/0287; G05D 2201/0201; G05B 2219/45003; G05B 2219/45017; Y02A 40/10; Y02A 40/28; G06Q 50/02
  See application file for complete search history.

(56) References Cited

U.S. PATENT DOCUMENTS

| | | | |
|---|---|---|---|
| 2008/0005177 A1* | 1/2008 | Steckel | A01B 79/005 |
| 2011/0054921 A1* | 3/2011 | Lynds | G06Q 10/04 |
| | | | 705/1.1 |
| 2011/0112730 A1 | 5/2011 | Rekow | |
| 2013/0166344 A1 | 6/2013 | Grothaus | |
| 2013/0173321 A1* | 7/2013 | Johnson | G06Q 50/02 |
| | | | 705/7.12 |
| 2014/0343803 A1* | 11/2014 | Losch | G05D 1/0276 |
| | | | 701/50 |
| 2015/0348419 A1* | 12/2015 | Matthews | A01B 69/00 |
| | | | 701/117 |
| 2016/0026940 A1* | 1/2016 | Johnson | A01B 79/005 |
| | | | 705/7.11 |
| 2016/0071410 A1* | 3/2016 | Rupp | A01D 41/1274 |
| | | | 701/50 |
| 2016/0078570 A1* | 3/2016 | Ethington | G06Q 10/06 |
| | | | 705/7.21 |
| 2016/0217228 A1* | 7/2016 | Mewes | A01B 79/005 |
| 2017/0287082 A1* | 10/2017 | Karube | G06Q 10/06311 |
| 2018/0232674 A1* | 8/2018 | Bilde | G06Q 10/06311 |
| 2018/0262385 A1* | 9/2018 | Hinni | H04L 41/00 |
| 2019/0057460 A1* | 2/2019 | Sakaguchi | G06Q 50/02 |
| 2019/0220964 A1* | 7/2019 | Mello | B64D 47/00 |

FOREIGN PATENT DOCUMENTS

| | | | |
|---|---|---|---|
| EP | 2174537 A1 * | 4/2010 | .......... A01B 79/005 |
| EP | 2174537 A1 | 4/2010 | |
| EP | 2605200 A1 | 6/2013 | |
| EP | 3097759 A1 | 11/2016 | |
| WO | WO2018206587 A1 | 11/2018 | |

* cited by examiner

SYSTEM AND METHOD FOR CONTROLLING AN AGRICULTURAL HARVESTING CAMPAIGN

CROSS REFERENCE TO RELATED APPLICATION

This application claims priority under 35 U.S.C. § 119 to German Patent Application No. DE 102018113327.8, filed Jun. 5, 2018, the entire disclosure of which is hereby incorporated by reference herein.

TECHNICAL FIELD

The technical field relates to an agricultural working machine. More specifically, the technical field relates to a system and method for managing a harvesting campaign that includes a plurality of agricultural working machines.

BACKGROUND

A self-driving agricultural working machine includes any one of the following: harvesters (e.g., combines and forage harvesters); prime movers (e.g., tractors or the like). Other types of self-driving agricultural working machines are contemplated. The agricultural working machine includes agricultural working functionality in order to perform an agricultural work process. One method for controlling harvesting activity performed by an agricultural working machine, such as combine harvesting, is disclosed in DE 10 2016 118 651 A1, incorporated by reference herein in its entirety. DE 10 2016 118 651 A1 uses machine-local field information provided by sensors of the agricultural working machine in order to optimize harvesting process chains. The optimization is based on field information from an environment detection device that is assigned to the relevant working machine. Using the output of the environment detection device, quality features (such as the crop density and/or grain moisture) may be determined and processed in the context of optimization.

DESCRIPTION OF THE FIGURES

The present application is further described in the detailed description which follows, in reference to the noted plurality of drawings by way of non-limiting examples of exemplary implementation, in which like reference numerals represent similar parts throughout the several views of the drawings, and wherein.

DETAILED DESCRIPTION

Figure 1:
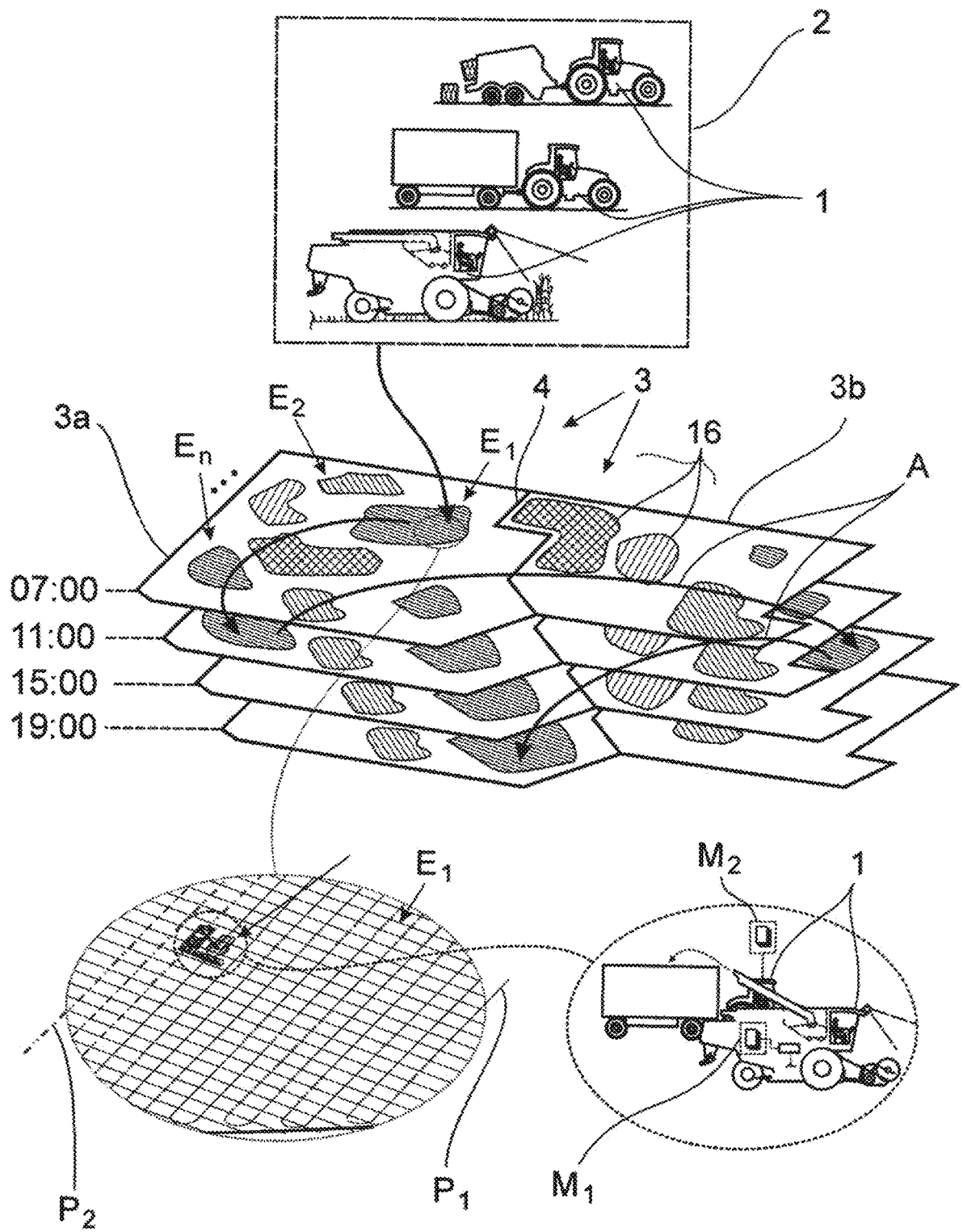
FIG. 1 shows a graphical representation of an agricultural harvesting campaign.

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

Optimized control of a part and/or an entire harvesting campaign is a complex challenge. The harvesting campaign may include harvesting activities that are to be processed within a duration of a harvesting campaign on an allotted field (e.g., on a field area comprising one or more fields). The optimized control may depend on one or more optimization criteria.

It may be difficult to configure develop a methodology such that the optimization of controlling the agricultural harvesting campaign is improved. In one implementation, the methodology may optimize control of the harvesting campaign using minimally complex open-loop control.

In one implementation, the control of the harvesting campaign is structured in a plurality of different open-loop control application levels. In this regard, the controlling of the harvesting campaign is distributed over the application levels so that the complexity of the open-loop control of the individual application levels is reduced, such as always minimal.

Information is generated in the plurality of application levels and in turn, the generated information may be provided to one, some, or all of the other application levels (such as always providing the generated information to all of the other application levels). In this context, the generation of information can, in a narrow sense, be the processing of input data into output data or, in a broader sense, the reception of data from a data source (e.g., a data source generates data, with the generated data being provided to all of the other application levels). Given this availability (such as the continuous availability) of information (such as field information) across all application levels, all of the information necessary for an efficient optimization of controlling the harvesting campaign may always be available.

Various types of generated information are contemplated. One type of generated information is remotely-sensed field information. Further, this demonstrates the particular advantage of making the generated information available to all application levels. In one implementation, receiving the remotely-sensed field information may be more complicated than generating local information (such as local environmental information). This is particularly relevant when the remotely-sensed field information is obtained from an external service provider.

In one implementation, the structure of the plurality of application levels includes any one, any combination, or all of: a coarse (or general) application level; a fine application level; and a machine application level. In practice, this tripartite division (into the 3 levels) may have a particularly low complexity in implementing open-loop control (e.g., control technology implementation) with respect to generating processing sequences, harvesting activities and machine control data.

In the further implementation, the harvesting campaign is controlled using a control system with different control routines. The control routines, explained in more detail below, may have reduced complexity. The term "control routine" may comprise a routine that can run sequentially and/or in parallel (or concurrently) as other routines, and that may be realized as software in the typical manner. The control routines may be executed on a control system, which may be equipped with distributed control hardware in a manner explained in further detail below. Specifically, one or more control routines may be assigned to one, some, or all of the application levels. For example, a general (or coarse) control routine may be assigned to the general (or coarse) application level, a fine control routine may be assigned to the fine application level, and a machine control routine may be assigned to the machine application level. Further, computing functionality (discussed further below), may be associated with one, some, or each of the general (or coarse) application level, the fine application level, and the machine application level.

As noted above, various types of information are contemplated. In this regard, any one, or both of the local machine information and information from machine-remote data sources with respect to the machine fleet is available for controlling the harvesting campaign. In one implementation, information from machine-remote data sources may be termed remote-sensing field information. In one implementation, both types of information are always or constantly available in one, some or all control routines.

In one implementation, in at least one of the control routines, geo-referenced remote-sensing field information is processed from data sources that are machine-remote with respect to the machine fleet (e.g., the data sources generating the geo-referenced remote-sensing field information is remote from the machine fleet). In this at least one of the control routines and/or in a different control routine, geo-referenced live field information from the machine's own data sources may be processed. In particular, one or both of sensor data sources, which may comprise sensor data generated by sensors resident in the machine fleet, and part or all the geo-referenced remote-sensing field information may be processed in one, or in at least two control routines (e.g., at least two control routines in the same application level or in different application levels).

Furthermore, the general (or coarse) control routine generates the processing sequence of the harvesting activities over the campaign timeline ($t_K$) based on the field information (e.g., remotely-sensed field information and/or live field information generated by sensors resident in the machine fleet). Further, the fine control routine generates the harvesting process chains based on the field information (e.g., remotely-sensed field information and/or live field information generated by sensors resident in the machine fleet) in order to control the processing sequence. In addition, the machine control routine generates machine control data based on the field information while the harvesting mode is running in the machine control routine in order for the machine control routine to control the harvesting process chains. In this regard, defining at least three control routines (general (or coarse) control routine, fine control routine, and machine control routine) that are each assigned to the respective one of the application levels (general (or coarse) application level, fine application level, and machine application level), and that are executed at least partly simultaneously may assist in implementing the agricultural harvesting campaign.

In one implementation, with regard to the definition of the respective control routines, the general (or coarse) control routine may generate the processing sequence of the harvesting activities over at least a part (or the entire) duration of the agricultural harvesting campaign based on the above-reference field information, the fine control routine may generate harvesting process chains based on the above-referenced field information for implementing the processing sequence, and the machine control routine may generate machine control data during the harvesting mode based on the above-referenced field information for implementing the harvesting process chains.

The general (or coarse) control routine may only be concerned with the chronological order and/or the temporal sequence in which the different harvesting activities are to be processed over the duration of the agricultural harvesting campaign. A harvesting activity may relate to the harvesting of an entire field and/or the harvesting of a field zone yet to be described.

The fine control routine relates to the generation of the harvesting process chains that are needed for running the above-described harvesting activities. For example, this may include the definition of subprocesses, such any one, any combination, or all of: harvesting subprocesses; transferring subprocesses (e.g., subprocesses involving the transfer of a crop); or the like. Finally, the machine control routine relates to the generation of specific machine control data for controlling the respective agricultural working machine (e.g., a particular machine control routine resident on a particular agricultural working machine may be tasked with controlling the particular agricultural working machine).

Structuring the control routines into the general (coarse) control routine, the fine control routine and the machine control routine may reduce the complexity with regard to the controlling of an entire agricultural harvesting campaign. In this regard, the increase in complexity associated with processing the different types of field information (e.g., the remotely-sensed field information and/or machine-local field information) may be balanced or compensated by the reduced complexity due to the structure of the control routines.

Further, in one implementation, one, some, or all control routines (e.g., the general (coarse) control routine, the fine control routine and the machine control routine) may process any one or any combination of field information (such as the remotely-sensed field information and/or machine-local field information). For example, machine-local field information (which may be generated by one or more sensors resident in the machine fleet) may also be accessed within or by the general (coarse) control routine in order to check whether the live field information is consistent with the remotely-sensed field information. If applicable, an adaptation of the processing sequence, or even a correction of the remotely-sensed field information, may be implemented during harvesting mode.

Likewise, It is contemplated for the fine control routine to derive or determine the crop density of a complete field from the remotely-sensed field information, such as, for example, when defining transfer subprocesses, which enables correspondingly long-term planning of the subprocesses for the transfer of the crop.

Finally, the machine control routine may use one or both of the remotely-sensed field information and the live field information, such as, for example, to estimate whether occurring fluctuations in the machine-local field information is only an "outlier" or a systematic trend.

All of the above indicates that the disclosed method and apparatus offers a particularly effective basis for optimizing the control of an agricultural harvesting campaign, thereby allowing for a particularly high degree of robustness, particularly in light of the anticipated or expected redundancies between the remotely-sensed field information and the live field information.

The disclosed method and apparatus may be operated on a distributed system hardware, which allows the adapting of the open-loop control of the respective open-loop control parameters. In particular, the general (coarse) control routine may generate the processing sequence of the harvest activities over the campaign timeline ($t_K$) based on the field information, the fine control routine may generate the harvesting process chains ($P_1$-$P_n$) based on the field information in order to control the processing sequence, and the machine control routine may generate the machine control data based on the field information while the harvesting mode is running in a machine control routine in order for the machine control routine to control the harvesting process chains.

In one implementation, the field allotment assigned to the harvesting campaign may be partitioned into geo-referenced field zones. In a specific implementation, each respective geo-referenced zone may be grouped as such due to at least one uniform quality feature for the respective geo-referenced zone. Further, the definition of the geo-referenced field zones may be saved in the control system. In this way, generating the processing sequence in the general (coarse) control routine may be simplified in that the geo-referenced field zones in the respective or relevant planning steps as a unit.

The machine control data (e.g., engine control data generated by sensors resident in the respective agricultural working machine) may be generated during harvesting mode as the machine control routine controls the respective agricultural working machine. In contrast, the general (coarse) control routine may generate the processing sequence, and the fine control routine may generate the harvesting process chains. In addition, one, some or all of the general (coarse) control routine, fine control routine, and machine control routine can execute at least partly simultaneously (e.g., run overlapping in time).

In one implementation, the fine control routine optimizes the harvesting process chains according to an optimization strategy. Alternatively, or in addition, the machine control routine optimizes machine control data according to an optimization strategy. Further, the optimized harvesting process chains and/or the optimized machine control data may be saved (e.g., archived) in the control system along with (e.g., correlated to) the assigned field zone (e.g., the assigned geo-referenced field zone) as remotely-sensed field information. Further, the remotely-sensed field information assigned to a respective field zone may be established in the context of the fine control routine, and/or in the context of the machine control routine for generating the harvesting process chains and/or for generating the machine control data for a respective field zone. In this way, the generated and optimized harvesting process chains and/or machine control data may be saved in the control system correlated to the respective field zone. Further, the field zones may be assigned not just a quality feature (e.g., at least one uniform quality feature), but also may be assigned optimized harvesting process chains and/or machine control data. Thus, partitioning the field allotment into field zones may be associated with a significant simplification of the relevant planning steps. This is the case in particular when the harvesting of the field zones is provided as a unit (e.g., the general (coarse) control routine defines the processing sequence for the harvesting activities such that respective field zones are always harvested as a unit).

In one implementation, a time-of-day-dependent change in the quality features of the overall field allotment or the field zones may be used. For example, the general (coarse) control routine may generate the processing sequence with reference to time, such as with reference to the time of day. Further, the remotely-sensed field information may be correlated to the time of day for the purpose of the general (coarse) control routine to generate the processing sequence with reference to a specific time. Further, the field zones may be correlated to the time of day. The partitioning of the field allotment assigned to the harvesting campaign into field zones may be performed separately in the general (coarse) control routine for different times of day and archived in the control system. The general (coarse) control routine may generate the processing sequence over the course of a time period (e.g., a single day) with regard to the changing quality feature values in the event that at least part of the field zones assume changing quality feature values at different times of day (e.g., the changing quality feature of grain moisture values may result in the general (coarse) control routine generating different processing sequences over the course of a single day). Thus, for a time-of-day-dependent change in the quality features of the overall field allotment or the field zones, the remotely-sensed field information, and/or the live field information, and/or the field zones may be referenced with respect to time of day. In particular for the field zones, this means that the partitioning of the field allotment into field zones may be performed separately for different times of day and saved (e.g., archived in the control system). Using the last-cited implementations, controlling the agricultural harvesting campaign optimized for the respective time of day may be implemented without a disproportionate increase in the complexity of the associated planning steps.

In one implementation, at least part of the remotely-sensed field information is calibrated based on the live field information. In particular, the remotely-sensed field information frequently may not exist in absolute values, and a calibration of this information may be warranted.

In one implementation, the field zones in the machine control routine are transmitted to the respective machine control of at least some of the working machines and output at the respective working machine (e.g., via a display or other type of user interface). Thus, in the machine control routine, the field zones may be displayed to the machine operator so that the operator has access to the information underlying the processing sequence. This may allow the operator to view the definition of the field zones in a clear manner, such as via a graphic representation.

In one implementation, the remotely-sensed field information comprises field information relating to a field allotment assigned to the harvesting campaign (e.g., biomass maps, grain mass maps, non-grain constituent mass maps, maturation maps, yield maps, swath deposit maps, soil moisture maps, dew maps, weed maps, weather information, or the like) that is provided by the machine-remote data sources (e.g., by satellites, drones, machine-remote databases, or the like). Further, the live field information may be generated by the machine's sensors of at least one working machine, such as a plurality of working machines of the machine fleet. In this way, the remotely-sensed field information on the one hand and the live field information on the other hand may be generated.

In one implementation, a self-driving agricultural working machine is disclosed for performing the disclosed method. Reference is made to all of the embodiments that are suitable for describing the working machine per se.

Referring to the figures, FIG. 1 shows a graphical representation of an agricultural harvesting campaign. As discussed above, the disclosed methodology may be applied to a wide range of agricultural working machines 1. In the scenario outlined in FIG. 1, the agricultural working machines 1 are assigned to a machine fleet 2. The agricultural working machines 1 are for example a combine, transport trucks and trailers, balers, prime movers, or the like. Other types of agricultural working functionality are contemplated. In this regard, the machine fleet 2 may be any combination and any numbers of the following: a combine, transport trucks and trailers, balers, or prime movers. Other agricultural working machines 1 are contemplated.

The disclosed methodology may serve to control an agricultural harvesting campaign. The term "harvesting campaign" may be defined to mean that predetermined harvesting activities $E_1$-$E_n$ are processed within a campaign timeline $t_K$ by a plurality of agricultural working machines 1 of the machine fleet 2 in the harvesting campaign on a field allotment 3 assigned to the harvesting campaign. The term "field allotment" may relate to a field or plurality of fields that are to be processed within the campaign timeline $t_K$. In the scenario shown in FIG. 2 (illustrating a graphical representation of the control routines on which the controlling of the agricultural harvesting campaign according to FIG. 1 is based), the field allotment 3 comprises two fields 3a, 3b that directly border each other on a borderline 4. Alternatively, the fields 3a, 3b of a field allotment 3 may be arranged at least partially separate from each other.

The campaign timeline $t_K$ may be calculated differently depending on the predominating conditions. In one implementation, the campaign timeline $t_K$ represents a harvesting timeline for the relevant harvested material that normally extends over several months.

To control such an agricultural harvesting campaign, the agricultural working machines 1 may be used in the most optimum chronological sequence with the most optimum machine control data. For this, extensive field information is available that may not only be geo-referenced but may also reference the time of day. This means that the relevant field information may assume different values depending on one or both of the location and/or on the time.

In order to be able to convert the above complex control task into simple subcontrol tasks, the controlling of the harvesting campaign may be executed on different application levels of open-loop control. On the application levels, information may be generated that is needed for implementing the control tasks. In general, it is provided that the generated information may be made available on one, some, or all of the other application levels. In one implementation, the information generated in this manner comprises at least remotely-sensed field information, explained further below. The resulting reduction in complexity in controlling the harvesting campaign is noted above.

In one implementation, three application levels are defined. Alternatively, fewer number of application levels (e.g., two applications levels) or greater number of application levels (e.g., four application levels, five application levels, six application levels, etc.) are contemplated as well. On the general (coarse) application level, the processing sequence A of harvesting activities $E_1$-$E_n$ is generated over the campaign timeline $t_K$ and provided to the other application levels (e.g., to the fine application level and/or to the machine application level). On a fine application level, harvesting process chains $P_1$-$P_n$ may be generated and provided in turn to the other application levels (e.g., to the general (course) application level and/or to the machine application level). Finally, on a machine application level, machine control data $M_1$-$M_n$ may be generated and provided to the other application levels (e.g., to the general (course) application level and/or to the fine application level). Consequently, the different application levels ultimately represent planning levels in which the harvesting campaign is planned with different degrees of abstraction.

In the realization of the disclosed methodology, a control routine is assigned to the application levels in which the part of the control of the harvesting campaign ascribed to the respective application level is completed. In one implementation, a general (coarse) control routine is assigned to the general (coarse) application level, a fine control routine is assigned to the fine application level, and a machine control routine is assigned to the machine application level.

In one implementation, the harvesting campaign is controlled using a control system 5, such as in the different control routines 6, 7, 8. As noted above, the term "control routine" may be understood to mean that a control process of any kind is running, which in particular runs based on the system hardware of the control system 5, explained further below. Control routines 6, 7, 8 may run sequentially and/or at least partially overlapping (e.g., at least partly simultaneously).

As noted above, the control routines 6, 7, 8 provide comprehensive field information for processing the control tasks. In the present case, it is assumed that at least two basic types of field information are available. Initially, it is provided that geo-referenced remotely-sensed field information 9 is processed in at least one of the control routines 6, 7, 8 from data sources 10 that are machine-remote relative to the machine fleet 2. This may comprise field information that may be filed (e.g., saved) in the machine-remote data sources 10. Information from data sources 10 may be communicated via network(s) 17 to machine-remote system hardware 13. The one or more network(s) 17 may comprise any combination of wired and/or wireless networks, such as combination of cellular, Wi-Fi, and the Internet.

Furthermore, geo-referenced live field information 11 may be processed in at least one of the control routines 6, 7, 8 from the machine's own data sources (e.g., sensor data sources such as the sensors 12 of the machine fleet 2). In one implementation, the live field information 11 comprises the field information that is generated and provided by local machines in the field (e.g., by the machine's own sensors 12 and during ongoing harvest mode). The live field information 11 may comprise machine-internal field information such as the level height, the grain moisture, etc. of the flow of harvested material passing through the agricultural working machine 1. Alternatively or in addition, the live field information 11 may be environmental information (e.g., the crop density and/or the crop moisture) in the immediate environment of the agricultural working machine 1.

With regard to the disclosed methodology, in one implementation, at least part of the field information 11 is available in at least two control routines. In particular, at least part of the remotely-sensed field information 9 and the live field information 11 is available in at least two control routines 6, 7, 8. This is noteworthy since, for example, not just remotely-sensed field information 9 but also live field information 11 may be accessed for example in the general control routine 6, even though the planning of the processing sequence A of the harvesting activities $E_1$-$E_n$ does not require the strong dynamics of live field information 11 per se. However, it has been recognized that the live field information 11 may, for example, be used in order to adapt the remotely-sensed field information 9 to the actual conditions in the surroundings of the respective agricultural working machine 1, as explained further below.

In general, in one implementation, each piece of control information available in a control routine 6, 7, 8 is available in one, some or all of the other (or remaining) control routines 6, 7, 8. This uniformity of the availability of field information across all control routines 6, 7, 8, and hence over all application levels, may allow for optimization of the harvesting campaign, taking into account all field information that is relevant in the specific case.

In one implementation, the remotely-sensed field information 9 comprises field information that relates to a field allotment 3 assigned to the harvesting campaign. Such field information is, for example, any one, any combination, or all of: biomass maps; grain mass maps; non-grain constituent mass maps; maturation maps; yield maps; swath deposit maps; soil moisture maps; dew maps; weed maps; weather information; or the like. The remotely-sensed field information 9 may be generated or provided by the relevant system hardware 13, 14 from any one, any combination, or all of: satellites; drones; machine-remote databases 15; or the like.

The live field information 11 in contrast may be generated or processed by the machine's sensors of at least one agricultural working machine 1, such as a plurality of agricultural working machines 1 of the machine fleet 2.

The disclosed structuring of the control routines 6, 7, 8 is of note. Initially, a general (coarse) control routine 6 is provided in which, based on the field information 9, 11, generates the processing sequence A of the harvest activities $E_1$-$E_n$ over the campaign timeline $t_K$. To control this processing sequence A, fine control routine 7 generates harvesting process chains $P_1$-$P_n$ based on field information 9, 11 and relate to the subprocesses of the harvesting activities $E_1$-$E_n$ underlying the processing sequence A. This includes for example transfer subprocesses (e.g., subprocesses involving transfer of a crop), transport subprocesses (e.g., subprocesses involving transport of a crop) or the like. In this regard, transmission of the processing sequence A of the harvest activities $E_1$-$E_n$ from the general (coarse) application level to the fine application level allows the fine control routine 7 to generate harvesting process chains $P_1$-$P_n$. Finally, machine control routine 8 generates machine control data $M_1$-$M_n$ to control the agricultural working machine 1 during harvesting mode based on the field information 9, 11. In one implementation, the machine control data $M_1$-$M_n$ is based on the harvesting process chains $P_1$-$P_n$. In this regard, transmission of the harvesting process chains $P_1$-$P_n$ from the fine application level to the machine application level allows the machine control routine 8 to generate the machine control data $M_1$-$M_n$. The machine control data $M_1$-$M_n$ is such data that are used for operating the agricultural working machine 1. This may include, for example, driving machine settings such as any one, any combination, or all of: the target right-of-way speed; the target tire pressure; aggregate settings such as threshing system settings, attachment settings; or the like.

In one implementation in which all pieces of field information 9, 11 are available (such as continuously available) in all control routines 6, 7, 8, this may result in optimizing the control of the agricultural harvesting campaign with particularly strong dynamics in that the dynamic live field information 11 may then be processed (such as continuously processed) in all control routines 6, 7, 8. Since a certain redundancy results between the remotely-sensed field information 9 and the live field information 11, the above optimization may be viewed as highly robust since faulty information does not necessarily lead to faulty control.

With the disclosed solution, the controlling of the harvesting campaign may be closely oriented around the current and dynamically changing conditions. Based on the remotely-sensed field information 9 and/or the live field information 11, a prediction of a quality feature over the course of the day may also be made based on the remotely-sensed field information 9, which may be further specified continuously, in particular based on the live field information 11.

Implementing the methodology may be realized with completely different hardware than that on which the respective control routines 6, 7, 8 are running. In one implementation, at least part of the control system 5, such as the general control routine 6 and/or the fine control routine 7, run on machine-remote system hardware 13. Additionally, at least part of the control system 5, such as the machine control routine 8, run on machine-remote system hardware 14. To this extent, the control system 5 is a distributed control system in terms of hardware.

Figure 2:
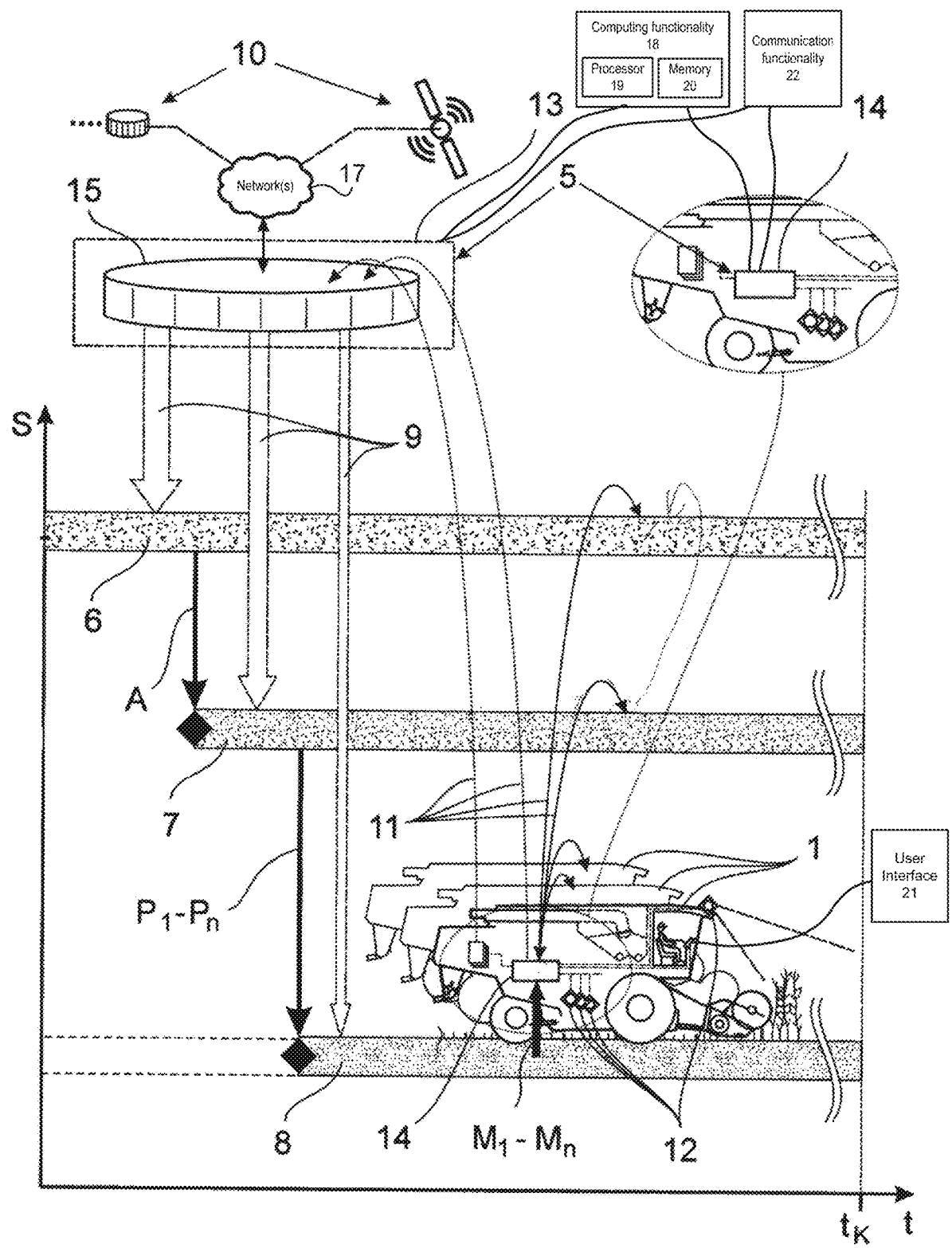
FIG. 2 shows a graphical representation of the control routines on which the controlling of the agricultural harvesting campaign according to FIG. 1 is based.

The machine-side system hardware 14 may be designed as a component of an otherwise available driver assistance system of the respective agricultural working machine 1. It is also contemplated however for this machine-side system hardware 14 to be realized separate from, and in addition to, an existing machine control, or an existing driver assistance system on the respective agricultural working machine 1. FIG. 2 illustrates one depiction of functionality within machine-side system hardware 14, including computing functionality 18 (including processor 19, and memory 20) and communication functionality 22. Communication functionality 22 is configured to enable communication (e.g., wired and/or wireless communication) with remote devices. The agricultural working machine 1 may further include user interface 21, which may be configured to output graphical representations, such as illustrated in FIG. 1, to the operator.

FIG. 2 further illustrates one depiction of functionality within machine-remote system hardware 13 as including computing functionality 18 (including processor 19, and memory 20) and communication functionality 22. In one implementation, the computing functionality 18 within machine-remote system hardware 13 is identical to the computing functionality 18 within machine-side system hardware 14. Alternatively, the computing functionality 18 within machine-remote system hardware 13 is different from the computing functionality 18 within machine-side system hardware 14. For example, the computing functionality 18 within machine-remote system hardware 13 may comprise cloud computing using a cloud service. Regardless, computing functionality 18 may be available at any one, any combination, or all of the applications levels, including any one, any combination, or all of: the coarse (or general) application level; the fine application level; and the machine application level.

FIG. 2 illustrates one implementation of computing functionality. In this regard, the methods, devices, processing, circuitry, and logic described herein may be implemented in many different ways and in many different combinations of hardware and software. In particular, computing functionality 18, including processor 19 and memory 20, are configured to process data and store data, respectively. Though processor 19 (which may comprise a microprocessor, controller, PLA or the like) and memory 20 are depicted as separate elements, they may be part of a single machine, which includes a microprocessor (or other type of controller) and a memory unit. The microprocessor and memory unit are merely one example of a computational configuration. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions, which may comprise computer-readable instructions, may implement the functionality described herein and may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

As discussed herein, the implementations may be distributed. For instance, the circuitry may include multiple distinct system components, such as multiple processors and memories, and may span multiple distributed processing systems, and may be configured on multiple application levels. Any one, any combination, or all of software, parameters, databases, and other data structures may be separately stored and managed (e.g., on multiple application levels), may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

FIG. 1 shows another version of the disclosed methodology in which the field allotment 3 assigned to the harvesting campaign is partitioned into geo-referenced field zones 16, in particular to simplify the generation of the processing sequence A of the harvesting activities $E_1$-$E_n$. In particular, the general control routine 6 partitions the field allotment 3 assigned to the harvesting campaign into geo-referenced field zones 16 in which a quality feature uniformly exists depending on at least one quality feature that is derived from the remotely-sensed field information 9 and/or live field information 11. For example, the general control routine 6 may define such a field zone 16 in that the grain moisture of the grain crop to be harvested lies within a specific moisture range. In FIG. 1, the identically defined field zones 16 are provided with a corresponding identical hatching (e.g., line hatching that is the same is in identically defined field zones 16).

By dividing the field allotment 3 into geo-referenced field zones with the same quality feature, the field allotment 3 may be easily structured with regard to the respective relevant quality feature. In this case, the arrangement is broadly advantageous in that the harvesting mode may be correspondingly executed differently for the different field zones. In the event that field zones with the same crop density are defined, agricultural working machines 1 with a different throughput may, for example, be distributed to the field zones 16 with a different crop density in order to yield overall optimum machine utilization.

The machine control data may be generated during harvesting mode in the context of the machine control routine 8. Contrastingly, the general control routine 6 may generate the processing sequence, and the fine control routine 7 may generate the harvesting process chains $P_1$-$P_n$, such as at least also before harvesting mode. In one implementation, the processing sequence and the harvesting process chains $P_1$-$P_n$ are optimized continuously, e.g., during harvesting mode, with respect to the current field information 9, 11.

The definition of the above field zones 16 may not only simplify the structuring of the harvesting mode, but may also allow the optimization results already achieved for the respective field zone 16 to be easily reused. In particular, harvesting process chains $P_1$-$P_n$ may be generated, which are optimized in the context of executing the fine control routine 7 according to an optimization strategy. Alternatively or in addition, machine control data $M_1$-$M_n$ may be generated, which are optimized in the context of executing the machine control routine 8 according to an optimization strategy. The optimized harvesting process chains $P_1$-$P_n$ and/or the optimized machine control data $M_1$-$M_n$ may be archivable in the control system 5 together with (correlated to) the assigned field zone 16 as remotely-sensed field information 9. This enables in principle the multiple use of optimization results for field zones 16 with the same quality feature that are disposed spatially separate (e.g., that are geographically separate). In particular, the optimization results generated in a first agricultural working machine 1 may be used for another agricultural working machine 1. In so doing, only the first-cited agricultural working machine 1 need be equipped for optimization in an open-loop control, whereas the other agricultural working machine 1 may only be rudimentarily equipped in an open-loop control.

In one implementation, the remotely-sensed field information 9 assigned to the relevant field zone 16 may be generated in a variety of ways, such as by the fine control routine 7, and/or by the machine control routine 8, which is configured to generate the harvesting process chains $P_1$-$P_n$ and/or configured to generate the machine control data $M_1$-$M_n$ for a field zone 16. As noted above, this remotely-sensed field information 9 may be optimization results, for example in the form of optimized aggregate settings, or the like.

Of note, easy generation of the processing sequence A may result when the processing sequence A for the harvesting activities $E_1$-$E_n$ is defined in the general control routine 6 such that the field zones 16 are always harvested as a unit. This uniform handling of the field zones 16 in the context of the control routines yields a particularly significant reduction of the above-addressed complexity.

In one implementation, the quality features under discussion (such as the grain moisture) may be subject to changes depending on the time (such as depending on the time of day). In this regard, the processing sequence may be generated with reference to time in the general control routine 6, and in particular with reference to the time of the day, wherein the remotely-sensed field information 9 and/or the live field information 11 may correspondingly reference the time of day for this purpose. In this example, the expression "reference the time of day" may mean that the harvesting activities $E_1$-$E_n$ are assigned a timestamp in the context of generating the processing sequence which may also include a time of day for processing the relevant harvesting activity $E_1$-$E_n$. To accomplish this, the relevant field information 9, 11 may reference (e.g., be correlated to) the time of day as noted above.

As illustrated in FIG. 1, the field zones 16 may also reference the time of day in this case. To accomplish this, the partitioning of the field allotment 3 assigned to the harvesting campaign into field zones 16 may be performed separately in the general control routine 6 for different times of day and archived in the control system.

The above-addressed processing sequence that references the time of day may be manifested, for example, in that the processing sequence A is generated in the general control routine 6 over the course of the day with regard to the changing quality feature values in the event that at least part of the field zones 16 assume changing quality feature values at different times of day (e.g., different grain moisture values result in different processing sequence A for different times of day). In FIG. 1, this is illustrated in that the processing sequence A provides the harvesting of the next field zone which preferably has an identical field zone definition depending on the anticipated processing time (e.g., FIG. 1 illustrates different processing sequences A correlated to different times of 07:00, 11:00, 15:00, 19:00).

In the disclosed methodology, there may simultaneously be remotely-sensed field information 9 and live field information 11, for example when the processing sequence A is generated in the context of the general control routine 6. In this case, a comparison between the remotely-sensed field information 9 and the live field information 11 occur to some extent so that the above-addressed outliers remain unconsidered in the field information. Broadly speaking, at least part of the remotely-sensed field information 9 may be calibrated based on the live field information 11. This may also be appropriate given the consideration that remotely-sensed field information 9 frequently does not exist as absolute values, but rather only as relative values.

The pronounced clarity of the above-addressed field zones 16 may also be advantageously used for the machine operators. To accomplish this, the field zones 16 may be transmitted in the machine control routine 8 to the respective machine control of at least one, some or all of the agricultural working machines 1 and displayed using the respective machine control. The operator of the respective agricultural working machine 1 may accordingly check whether or not the division of the field zones 16 corresponds to the actual conditions with regard to the respective quality feature. On this basis, the user may intervene to correct the control of the agricultural working machine 1.

In accordance with one implementation, the agricultural working machine 1 is disclosed for performing the above-referenced methodology.

Figure 3A:
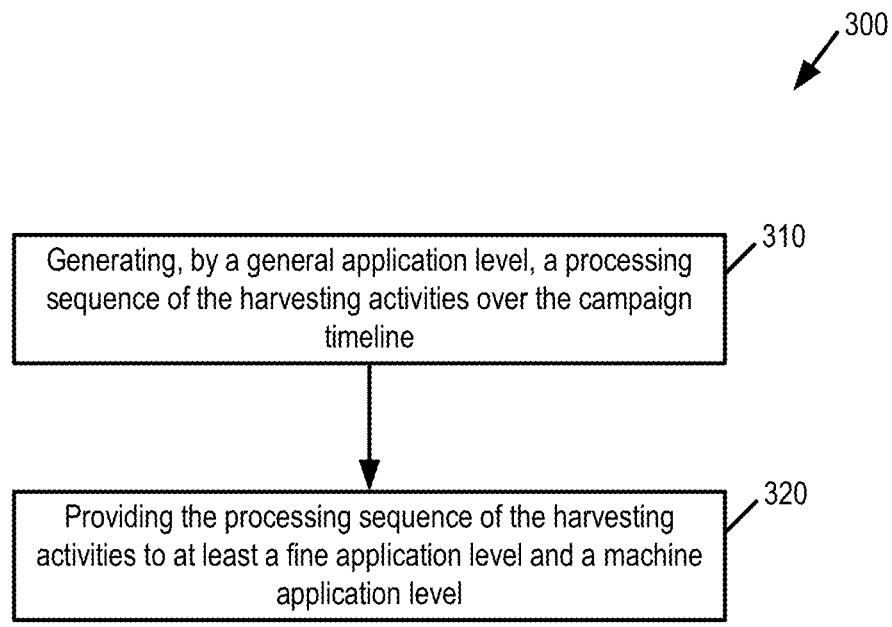
FIG. 3A shows a first flow chart.

FIG. 3A shows a first flow chart 300 including at 310 generating, by a general application level, a processing sequence of the harvesting activities over the campaign timeline, and at 320, providing the processing sequence of the harvesting activities to at least a fine application level and a machine application level.

Figure 3B:
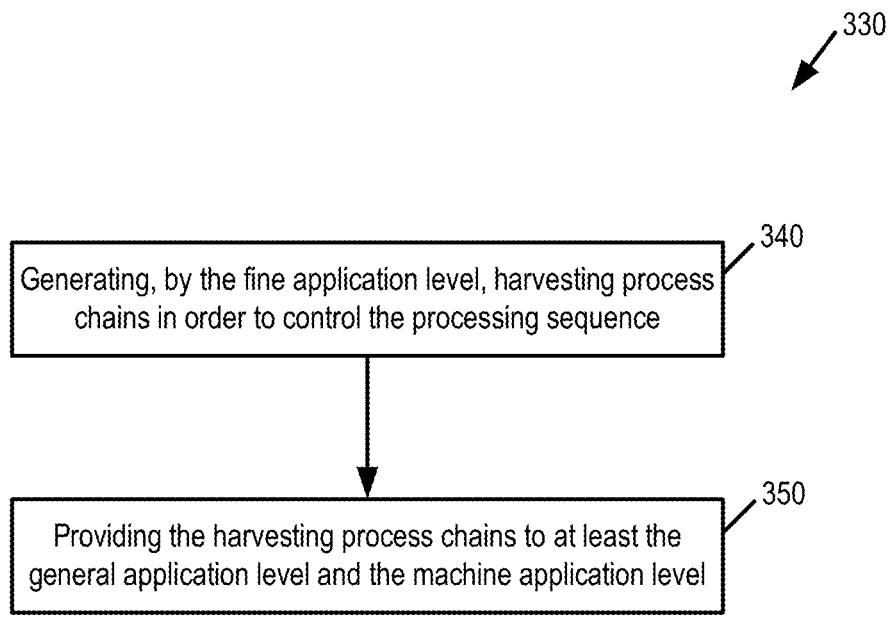
FIG. 3B shows a second flow chart.

FIG. 3B shows a second flow chart 330 including at 340 generating, by the fine application level, harvesting process chains in order to control the processing sequence, and at 350, providing the harvesting process chains to at least the general application level and the machine application level.

Figure 3C:
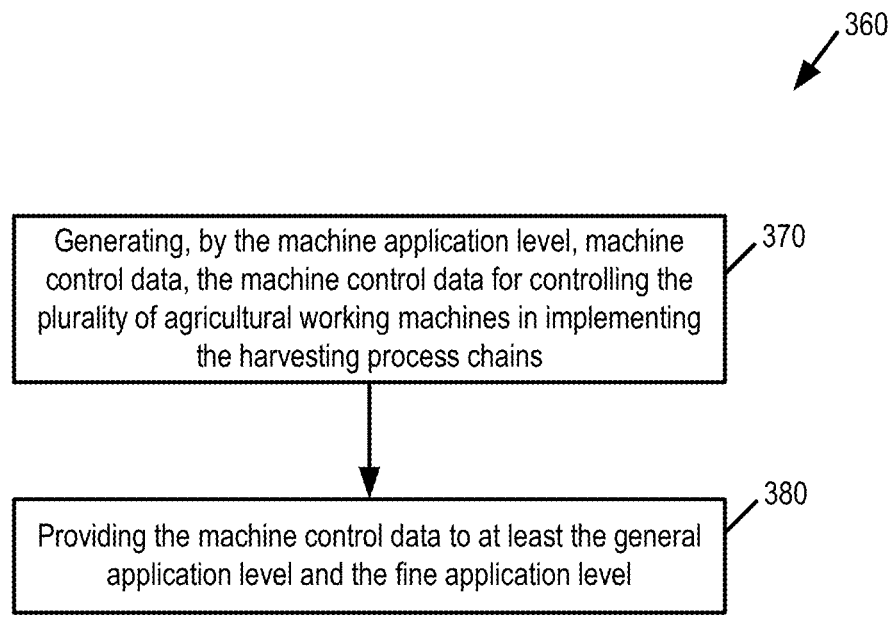
FIG. 3C shows a third flow chart.

FIG. 3C shows a third flow chart 360 including at 370 generating, by the machine application level, machine control data, the machine control data for controlling the plurality of agricultural working machines in implementing the harvesting process chains, and at 380, providing the machine control data to at least the general application level and the fine application level.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

LIST OF REFERENCE NUMBERS

1 Working machine
2 Machine fleet
3 Field allocation
3a, 3b Fields
A processing sequence
$E_1$-$E_n$ Harvesting activities
4 Borderline
5 Control system
6 General control routine
7 Fine control routine
8 Machine control routine
9 Remotely-sensed field information
10 Machine-remote data source
11 Live field information
12 Sensors
$P_1$-$P_n$ Harvesting process chains
$M_1$-$M_n$ Machine control data
13 Machine-remote system hardware
14 Machine system hardware
15 Machine-remote database
16 Field zones
17 Network
18 Computing functionality
19 Processor
20 Memory
21 User Interface
22 Communication Functionality

The invention claimed is:

1. A method for controlling an agricultural harvesting campaign in which predetermined harvesting activities are processed within a campaign timeline by a plurality of agricultural working machines of a machine fleet on a field allotment assigned to the harvesting campaign, the method comprising:
   generating, by a general application level, a processing sequence of the harvesting activities over the campaign timeline;
   providing the processing sequence of the harvesting activities to at least a fine application level and a machine application level;
   generating, by the fine application level, harvesting process chains in order to control the processing sequence;

providing the harvesting process chains to at least the general application level and the machine application level;

generating, by the machine application level, machine control data, the machine control data for controlling the plurality of agricultural working machines in implementing the harvesting process chains;

transmitting the machine control data to at least the general application level and the fine application level; and controlling the plurality of agricultural work machines using the machine control data in implementing the harvesting process chains;

wherein the controlling of the harvesting campaign is executed on the general, fine, and machine application levels of open-loop control by continuously generating information, the generated information comprising remotely-sensed field information, and wherein the generated information is continuously provided from one of the general, fine, and machine application levels to a remainder of the general, fine, and machine application levels.

2. The method of claim 1, wherein a general control routine is assigned to the general application level in order to generate the processing sequence and to provide the processing sequence to the fine application level and the machine application level wherein a fine control routine is assigned to the fine application level in order to generate the harvesting process chains and to provide the harvesting process chains to the general application level and the machine application level; and wherein a machine control routine is assigned to the machine application level in order to generate the machine control data and to provide the machine control data to the general application level and the fine application level.

3. The method of claim 2, wherein geo-referenced remotely-sensed field information is processed in at least one of the general control routine, the fine control routine, or the machine control routine from data sources that are machine-remote in terms of the machine fleet; and wherein geo-referenced live field information is processed in at least one of the general control routine, the fine control routine, or the machine control routine from at least one of the plurality of agricultural working machines' own data sources.

4. The method of claim 3, wherein the geo-referenced live field information is processed in at least one of the general control routine or the fine control routine.

5. The method of claim 4, wherein at least part of the remotely-sensed field information and at least part of the live field information are processed in at least two of the general control routine, the fine control routine, and the machine control routine; and wherein control information available in one of the general control routine, the fine control routine, or the machine control routine is available in a remainder of the general control routine, the fine control routine, and the machine control routine.

6. The method of claim 5, wherein the general control routine generates the processing sequence of the harvest activities over the campaign timeline based on the remotely-sensed field information and the live field information;

wherein the fine control routine generates the harvesting process chains based on the remotely-sensed field information and the live field information for controlling the processing sequence; and the machine control routine generates the machine control data while a harvesting mode is running based on the remotely-sensed field information and the live field information for controlling the harvesting process chains.

7. The method according to claim 6, wherein the general control routine and the fine control routine are executed on machine-remote system hardware remote from the plurality of agricultural working machines; and wherein the machine control routine is executed on machine system hardware resident in the plurality of agricultural working machines.

8. The method of claim 6, wherein the general control routine partitions the field allotment into geo-referenced field zones in which a quality feature uniformly exists depending on at least one quality feature that is derived from at least one or both of the remotely-sensed field information or the live field information;

wherein a control system comprises the general control routine, the fine control routine, and the machine control routine; and wherein the partitioning of the field allotment into the geo-referenced field zones is archived in the control system.

9. The method of claim 8, wherein the fine control routine generates the harvesting process chains according to an optimization strategy;

wherein the machine control routine generates the machine control data according to the optimization strategy; and wherein one or both of the harvesting process chains or the machine control data are archived in the control system along with an assigned relevant field zone as the remotely-sensed field information.

10. The method of claim 9, wherein the remotely-sensed field information as assigned to the relevant field zone is established by at least one or both of the fine control routine in generating the harvesting process chains or the machine control routine in generating the machine control data for the relevant field zone.

11. The method of claim 10, wherein the general control routine generates the processing sequence with reference to a time of day; and wherein the remotely-sensed field information references the time of day for a purpose of use in combination with the processing sequence.

12. The method of claim 11, wherein the field zones reference the time of day; and wherein the partitioning of the field allotment assigned to the harvesting campaign into field zones is performed separately in the general control routine for different times of day and archived in the control system.

13. The method of claim 12, wherein the general control routing generates the processing sequence over a course of a day with regard to changing grain moisture values in response to at least part of the field zones having changing grain moisture values at different times of the day.

14. The method of claim 8, wherein the general control routine defines the processing sequence for the harvesting activities such that the field zones are always harvested as a unit.

15. The method of claim 8, wherein the field zones are transmitted in the machine control routine to a respective machine control of at least some of the plurality of agricultural working machines and displayed using the respective machine control.

16. The method of claim 6, wherein the machine control routine generates the machine control data during harvesting mode;
   wherein the general control routine generates the processing sequence before the harvesting mode; and
   wherein the fine control routine generates the harvesting process chains before the harvesting mode.

17. The method of claim 6, wherein at least part of the remotely-sensed field information is calibrated based on the live field information.

18. The method of claim 6, wherein the remotely-sensed field information comprises field information relating to a field allotment assigned to the harvesting campaign including at least one of biomass maps, grain mass maps, non-grain constituent mass maps, maturation maps, yield maps, swath deposit maps, soil moisture maps, dew maps, weed maps, or weather information that is provided by at least one of satellites, drones, or machine-remote databases.

19. The method of claim 6, wherein the live field information is generated by sensors of at least one of the plurality of working machines of the machine fleet.

* * * * *